United States Patent [19]
Ohkura et al.

[11] Patent Number: 5,528,519
[45] Date of Patent: Jun. 18, 1996

[54] CONNECTOR FOR MEASURING APPARATUS

[75] Inventors: Tadahiro Ohkura; Toshiyuki Yoshida; Mitsuru Kainuma; Kazuo Aoki, all of Yokohama, Japan

[73] Assignee: Otax Co., Ltd., Japan

[21] Appl. No.: 245,706

[22] Filed: May 18, 1994

[30] Foreign Application Priority Data

May 20, 1993 [JP] Japan .................................. 5-118522

[51] Int. Cl.⁶ ........................................... G01D 18/00
[52] U.S. Cl. .............................. 364/571.04; 364/571.01
[58] Field of Search ................... 364/571.01, 571.02, 364/571.03, 571.04, 571.05, 571.07

[56] References Cited

U.S. PATENT DOCUMENTS

| | | | |
|---|---|---|---|
| 4,303,984 | 12/1981 | Hovig | 364/571.07 |
| 4,327,416 | 4/1982 | Jerrim | 364/481 |
| 4,418,392 | 11/1983 | Hata | 364/571.07 |
| 4,481,804 | 11/1984 | Eberhand et al. | 73/1 G |
| 4,598,381 | 7/1986 | Cucci | 364/571.05 X |
| 4,621,643 | 11/1986 | New, Jr. et al. | 128/633 |
| 4,845,649 | 7/1989 | Eckardt et al. | 364/571.02 |
| 4,868,476 | 9/1989 | Respaut | 318/632 |
| 5,070,732 | 12/1991 | Duncan et al. | 364/571.08 X |
| 5,089,979 | 2/1992 | McEachern et al. | 364/571.04 |
| 5,347,476 | 9/1994 | McBean, Sr. | 364/571.04 |
| 5,355,129 | 10/1994 | Baumann | 340/870.04 |
| 5,357,953 | 10/1994 | Merrick et al. | 128/633 |
| 5,365,462 | 11/1994 | McBean, Sr. | 364/571.04 |
| 5,375,073 | 2/1994 | McBean | 364/571.01 |
| 5,377,128 | 12/1994 | McBean | 364/571.04 |

*Primary Examiner*—Edward R. Cosimano
*Attorney, Agent, or Firm*—Lorusso & Loud

[57] ABSTRACT

In a connector apparatus used to a measuring apparatus, a method for connecting a sensor to the measuring apparatus is standardized without any calibration. The connector apparatus is arranged by comprising: a measuring apparatus for storing therein a read command program: a connector containing a ROM (read-only memory) from which a measurement item is readable in accordance with the read command program stored in the measuring apparatus; and a sensor connected to the connector and operable in accordance with the measurement item read out from the ROM.

2 Claims, 6 Drawing Sheets

CONNECTOR FOR MEASURING APPARATUS

BACKGROUND OF THE INVENTION

1. Field of the Invention

The present invention generally relates to a connector apparatus used in a measuring apparatus. More specifically, the present invention is directed to such a connector apparatus for a measuring system, in which a measurement identification code or item in a ROM built in the connector is read out in accordance with a read command program stored in the measuring system, and a sensor is operated based on this measurement item.

2. Description of Prior Art

Figure 1:
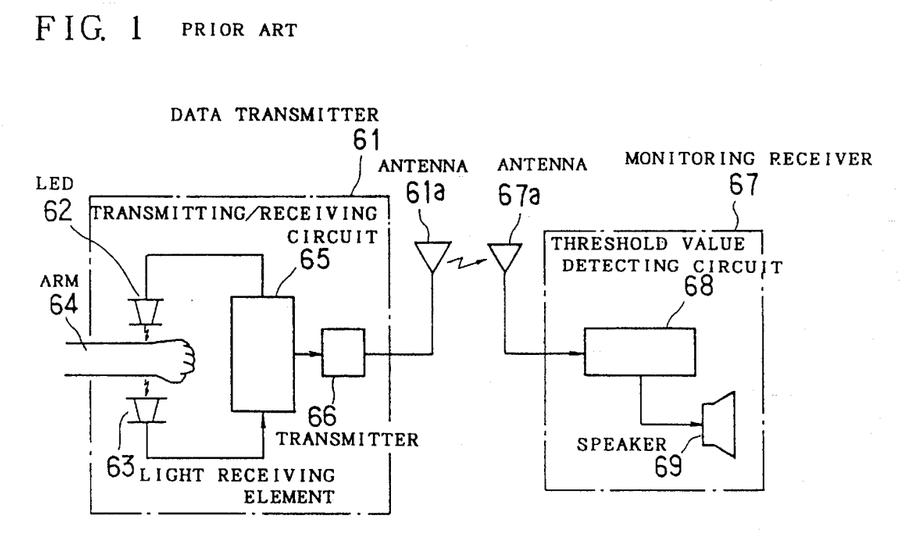
FIG. 1 schematically shows an arrangement of the conventional blood monitoring apparatus.

Conventionally, as represented in FIG. 1, blood monitoring apparatus has been known such as Japanese Patent Application No. 4-33372 filed in 1992. This conventional blood monitoring apparatus includes a blood monitoring data transmitter 61 and a blood oxygen concentration monitoring receiver 67. The data transmitter 61 includes a LED 62, a light receiving element 63, an infrared transmitting/receiving circuit 65, a radio transmitter 66, and a transmitting antenna 61a. The blood oxygen concentration monitoring receiver 67 includes a receiving antenna 67a, an oxygen concentration threshold value detecting circuit 68, and a speaker 69 for warning a decrease in oxygen concentration.

When the infrared radiation emitted from the LED 62 penetrates through the arm 64 of the human body and is received by the light receiving element 63, the light receiving element 63 transmits wavelength data indicative of variations in the absorption ratio caused by the oxygen concentration in the blood to the infrared transmitting/receiving circuit 65 in this blood monitoring apparatus. The wavelength data acquired by the infrared transmitting/receiving circuit 65 is transmitted from the receiving antenna 67a via the transmitting antenna 61a to the blood oxygen concentration monitoring receiver 67.

Upon detection of lowering of the oxygen concentration, the oxygen concentration lowering warning speaker 69 is operated to announce that the oxygen concentration is lowered. The decrease of oxygen concentration caused by the wavelength data is detected by the oxygen concentration threshold value detecting circuit 68 employed in the blood oxygen concentration monitoring receiver 67.

Figure 2:
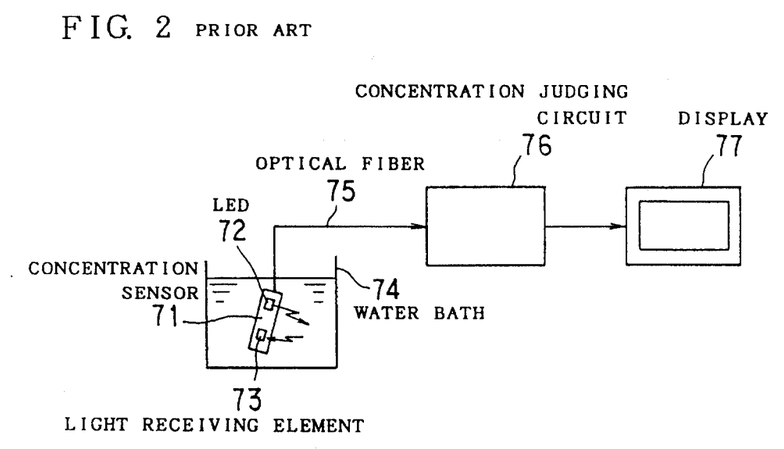
FIG. 2 is a schematic block diagram of the conventional liquid sensor.

As illustrated in FIG. 2, a liquid sensor is known such as Japanese Patent Application No. 4-74047 filed in 1992. This conventional liquid sensor includes a liquid concentration sensor 71 including a LED 72 and a light receiving element 73 dipped into the water bath 74; a liquid concentration judging circuit 76 connected to the liquid concentration sensor 71 by an optical fiber 75; and also a display 77.

When the liquid concentration sensor 71 is dipped into the water bath 74 and the light is irradiated from the LED 72 to the liquid contained in the water bath 74, the light propagated through this liquid is received by the light receiving element 73 in this conventional liquid sensor. Since the strengths, or intensity of the light received by the light receiving element 73 are in direct proportion to concentration of the liquid, this intensity data is processed in the liquid concentration judging circuit 76, and the processed data is displayed on the display 77.

In this case, when such data is produced indicating that the light having the specific wavelength is blocked, or passes through the liquid due to variation in the component of this liquid, chemical changes of the liquid can be detected.

In general, commercially available optical sensors are constructed of either a pair of light emitting element/light receiving element, or only a light receiving element manufactured in accordance with the particular measurement to be made.

In such an optical sensor and a measuring apparatus, on one hand, the optical sensor is limited to the particular specified measurement, for instance, oxygen concentration in blood, respiration periods, pulse rates, and to detect chemical changes in a specific fluid. On the other hand, the measuring apparatus is exclusively used with such a chemical sensor having the specified measurement.

Since connections for optical sensors with the measuring apparatus have not yet been standardized, the connection sequence for the optical sensor and the measuring apparatus is often difficult and must be performed manually every time this optical sensor is connected to the measuring apparatus.

Since keys are provided on the measuring apparatus for selecting one measurement from a plurality of possible measurements and the respective circuits are connected via wiring logic, a change of logic operation is not easily performed and the key operation becomes complex.

Furthermore, calibration is required every time the measurement is performed, measuring precision is deteriorated due to errors in calibration, and the corrective values must be modified in accordance with the measurement items.

SUMMARY OF THE INVENTION

The present invention has been made in an attempt to solve the above-described conventional problems, and therefore has an object to provide a connector apparatus used in a measuring apparatus, in which a connection method for connecting a sensor to the measuring apparatus is standardized.

Another object of the present invention is to provide such a connector apparatus utilized with a measuring apparatus, in which a mechanical key employed in either the connector or the measuring apparatus may be realized as software, and logic programming may be realized in the respective circuits, so that no calibration is required for these measurement items, higher measuring precision is achieved, and also a correction value is readily modified.

To achieve these objects, a connector apparatus used in a measuring apparatus according to the present invention includes a measuring apparatus for storing therein a read command program;

a connector containing a ROM (read-only memory) from which a measurement identification code or item is readable in accordance with the read command program stored in the measuring apparatus; and a sensor connected to the connector and operable in accordance with the measurement item read out from the ROM.

In the above-described connector apparatus used in the measuring apparatus, the ROM (read-only memory) from which the measurement items are readable in accordance with the read command program, is arranged by a PROM (programmable read-only memory).

In the measuring apparatus, a jack is provided which is engaged with the connector.

A sensor pulse transmitting circuit for transmitting a sensor pulse via the jack engaged with the connector to the sensor is employed in the measuring apparatus.

A background noise eliminating circuit for eliminating background noise related to the sensor, which is inputted via the jack, is provided with the measuring circuit.

A sensing data shaping circuit for shaping sensing data outputted from the background noise is provided in the measuring apparatus.

In the measuring apparatus, there is provided a correction table used in accordance with the read command program.

The correction table is stored into an EEPROM (electrically erasable PROM).

A correction calculation program is provided with the measuring apparatus, by which the data read out from the sensor in accordance with the read command program is corrected.

A corrected data outputting circuit for outputting the corrected data which has been corrected in accordance with the correction calculation program, is employed in the measuring apparatus.

A display for representing the corrected data derived from the corrected data output circuit is provided with the measuring apparatus.

In accordance with the connector apparatus used in the measuring apparatus, the measurement identification codes or items are read out from the ROM contained in the connector in accordance with the read command program. Since the sensor is coupled with the measuring apparatus, discrimination is made of the sensor type as well as the measurement item, and further the measurement can be done in the measuring apparatus.

The measuring identification codes in the PROM are read out in accordance with the read command program.

The connector is engaged with the jack provided on the measuring apparatus.

From the sensor pulse transmitting circuit provided in the measuring apparatus, the sensor pulse is sent out via the jack to the sensor.

Background noise in the signal from the sensor is eliminated by the background noise eliminating circuit.

The sensing data output from the background noise eliminating circuit is shaped by the sensing data shaping circuit provided with the measuring apparatus.

The correction table employed in the measuring apparatus is read in accordance with the read command program.

This correction table is stored into the EEPROM.

The data corrected in accordance with the correction calculation program is outputted from the corrected data output circuit employed in the measuring apparatus by the read command program.

The data corrected in accordance with the correction calculation program is outputted from the corrected data outputting circuit provided in the measuring apparatus.

Furthermore, the data corrected in the corrected data output circuit is displayed on the display provided with the measuring apparatus.

BRIEF DESCRIPTION OF THE DRAWINGS

For a better understanding of the present invention, reference is made of the detailed description to be read in conjunction with the accompanying drawings, in which.

DETAILED DESCRIPTION OF PREFERRED EMBODIMENTS

Referring now to the drawings, a connector apparatus used in a measuring apparatus according to a preferred embodiment of the present invention will be described in detail.

Figure 3:
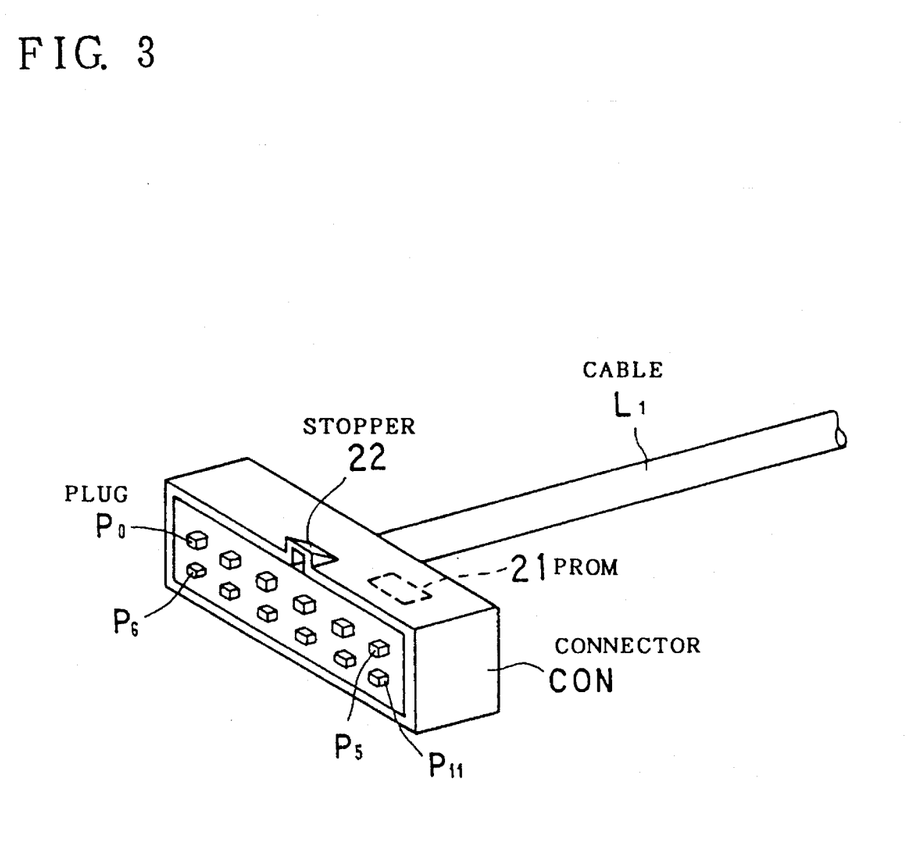
FIG. 3 is a perspective view of a connector apparatus used in a measuring apparatus, according to one preferred embodiment of the present invention.
Figure 4:
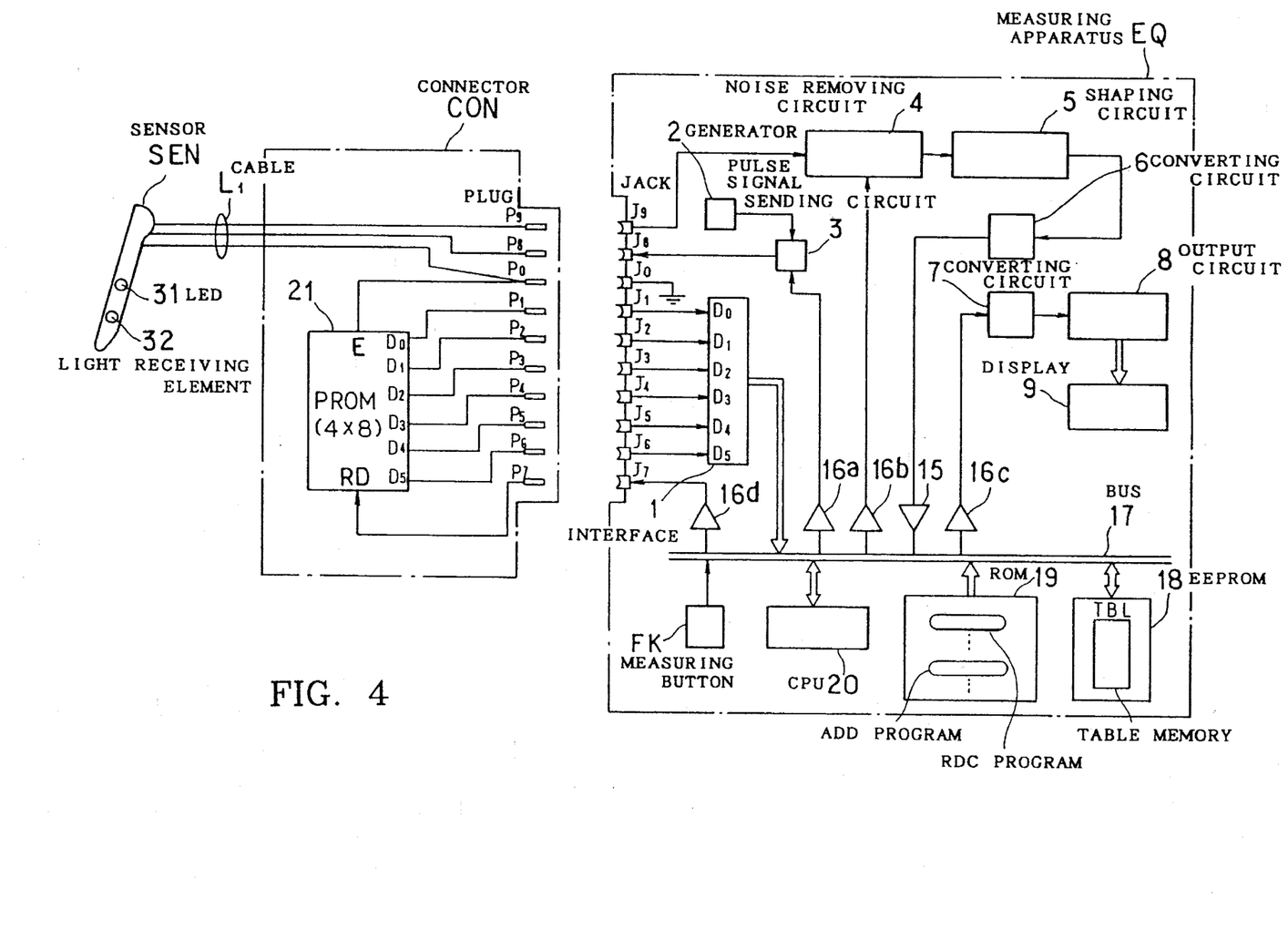
FIG. 4 is a schematic block diagram for indicating the connector apparatus used in the measuring apparatus, according to one preferred embodiment of the present invention.

FIG. 3 and FIG. 4 represent a connector apparatus used in a measuring apparatus according to one preferred embodiment of the present invention. This connector apparatus includes a measuring apparatus "EQ" for storing therein a read command program RDC, a connector "CON" containing a ROM (read-only memory) from which a measurement identification code or item is readable in accordance with the read command program provided in the measuring apparatus, and a sensor "SEN" connected to the connector "CON" and operable in accordance with the measurement item read out from the ROM.

As shown in FIG. 3, a cable "$L_1$" is provided to connect the sensor on one side of this connector "CON" which has pins or plugs $P_0$ to $P_{11}$ (note that plugs $P_{10}$ and $P_{11}$ are spare plugs). A stopper 22 is formed on the upper surface of the other side of the connector "CON". Also, a PROM (programmable read-only memory) in the form of a molded PROM chip 21 as shown by a dotted line, is built into the connector "CON". When the connector CON is connected to the measuring apparatus EQ, the stopper 22 is engaged with a latching portion (not shown in detail).

As shown in FIG. 4, the plugs $P_0$ to $P_9$ of the connector CON are designed to be inserted into respective jacks $J_0$ to $J_9$ employed in the measuring apparatus EQ. A sensor "SEN" employing an LED 31 and a light receiving element 32 is connected to the connector/sensor cable $L_1$.

The 4×8 bit-PROM 21 built in the connector CON is constructed of an 8-pin package with connecting pins E, RD, $D_0$ to $D_5$. The pin E is connected to the plug $P_0$, the pin RD is connected to the plug $P_9$, and the pins $D_0$ to $D_5$ are connected to the plugs $P_1$ to $P_6$, respectively. The plugs $P_0$, $P_8$, $P_9$ are connected via the connector-to-sensor cable $L_1$ to the sensor SEN which includes the LED 31 and the light receiving element 32.

When the plugs $P_0$ to $P_9$ of the connector CON are coupled with the jacks $J_0$ to $J_9$ of the measuring apparatus EQ, the measurement operation has been prepared.

As indicated by FIG. 4, the measuring apparatus EQ includes a connector/data pin interface 1 connected via the pins $D_0$ to $D_5$ to the jacks $J_1$ to $J_8$, a sensor pulse sending circuit 3 to which a sensor pulse generator 2 has been connected, and a background noise removing circuit 4 constructed of an operational amplifier whose amplification is controllable. This measuring apparatus EQ further includes a sensing data shaping circuit 5, an A/D (analog-to-digital) converting circuit 6, a D/A (digital-to-analog) converting circuit 7, a corrected data output circuit 8, and a display 9. Also, the measuring circuit EQ further contains a measuring button FK, a CPU (central processing unit) 20 having calculating registers $R_1$ to $R_4$, a ROM (read-only memory) 19 for storing therein the read command program RDC and a correction calculation program ADD, and an EEPROM (electrically erasable programmable ROM) 18 with a correction table TBL. The jack $J_0$ is connected to the reference potential point, whereas the jacks $J_1$ to $J_8$ are connected to the pins $D_0$ to $D_5$ of the connector/data pin interface 1. The output side of this connector/data pin interface 1 is connected to a data bus 17.

The output terminal of the background noise removing circuit 4 to which the jack $J_9$ is connected, is coupled via the sensing data shaping circuit 5, the A/D converting circuit 6, and the cable receiver 15 to the above-described data bus 17. Furthermore, cable drivers 16a, 16b, 16c connected to this data bus 17 are connected to the sensor pulse sending circuit 3, the background noise removing circuit 4, and the control input terminal of the D/A converting circuit 7. The cable driver 16d is connected to the jack JT.

The output terminal of the D/A converting circuit 7 is connected via the corrected data output circuit 8 to the display 9. Also, the measuring button FK, the CPU 20, the ROM 19, and the EEPROM 18 are connected to the data bus 17.

Figure 5:
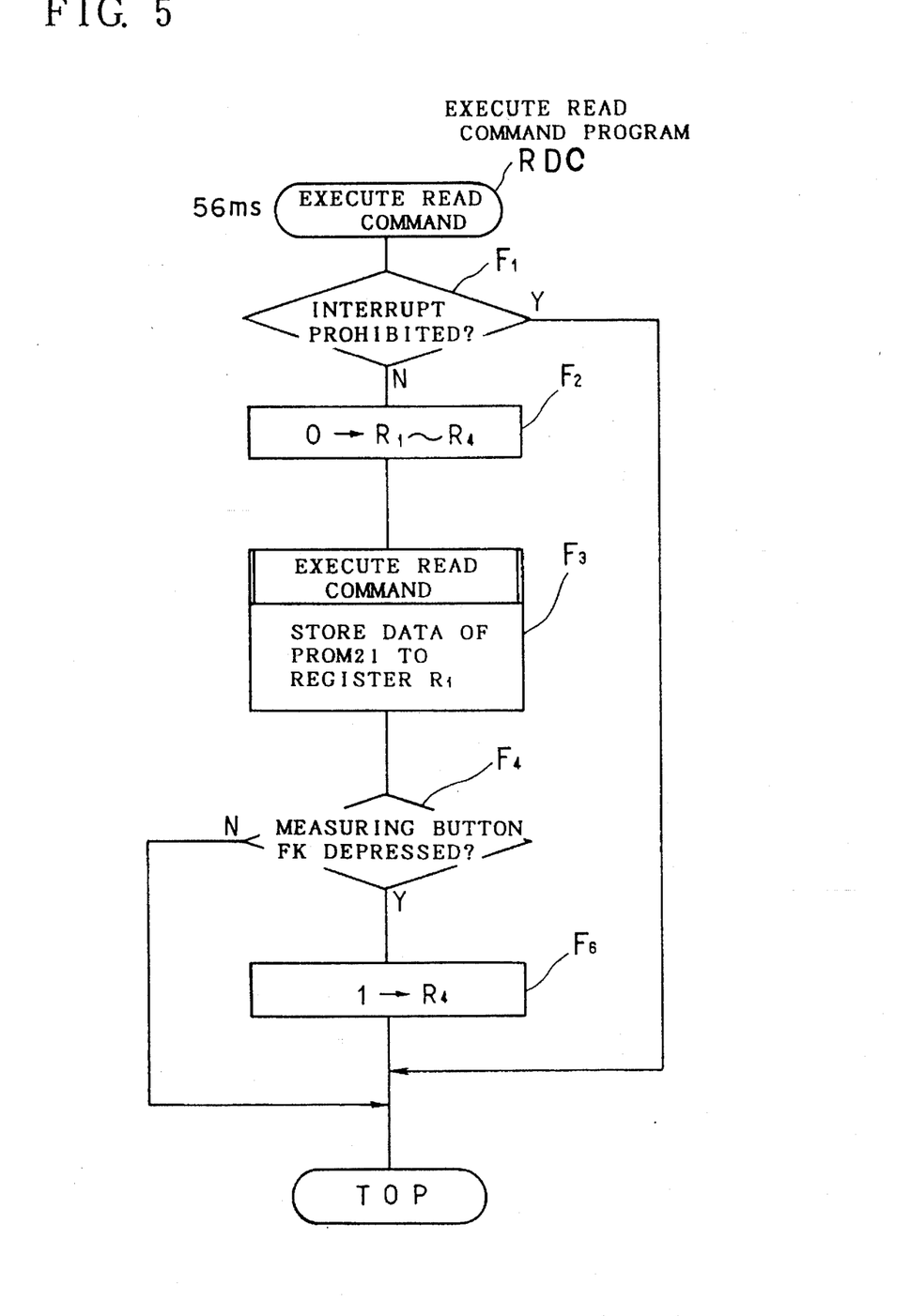
FIG. 5 is a flow chart for explaining a read command program executed in the connector apparatus used in the measuring apparatus of the present invention.

The read command program RDC is a periodic (cyclic) program initiated by an execution managing program in a period of 56 mS (milliseconds), as indicated in FIG. 5. This program is mainly constructed of judging boxes $F_1$, $F_4$, processing boxes $F_2$, $F_6$, and a subroutine $F_3$. At the judging box $F_1$, a judgement is made as to whether or not an interrupt is prohibited. When it is judged that the interrupt is not prohibited at the judging box $F_1$, the contents of the calculation registers $R_1$ to $R_4$ are initialized at the processing box $F_2$. Subsequently, the numeral values of the PROM 21 ($D_0$ to $D_5$) are stored into the calculation register $R_1$ at the read command subroutine $F_3$. When the measuring button FK shown in FIG. 4 is depressed, the process operation is advanced from the judging box $F_4$ to the processing box $F_6$. Then, after the content of the calculation register $R_4$ is set to 1 at the processing box $F_2$, the control operation is transferred to the execution managing program.

To the contrary, when it is so judged that the interrupt is prohibited at the previous judging box $F_1$, and also when the judging result at the judging box $F_4$ becomes "NO", no process operation is executed and the control operation is transferred to the execution managing program.

Figure 6:
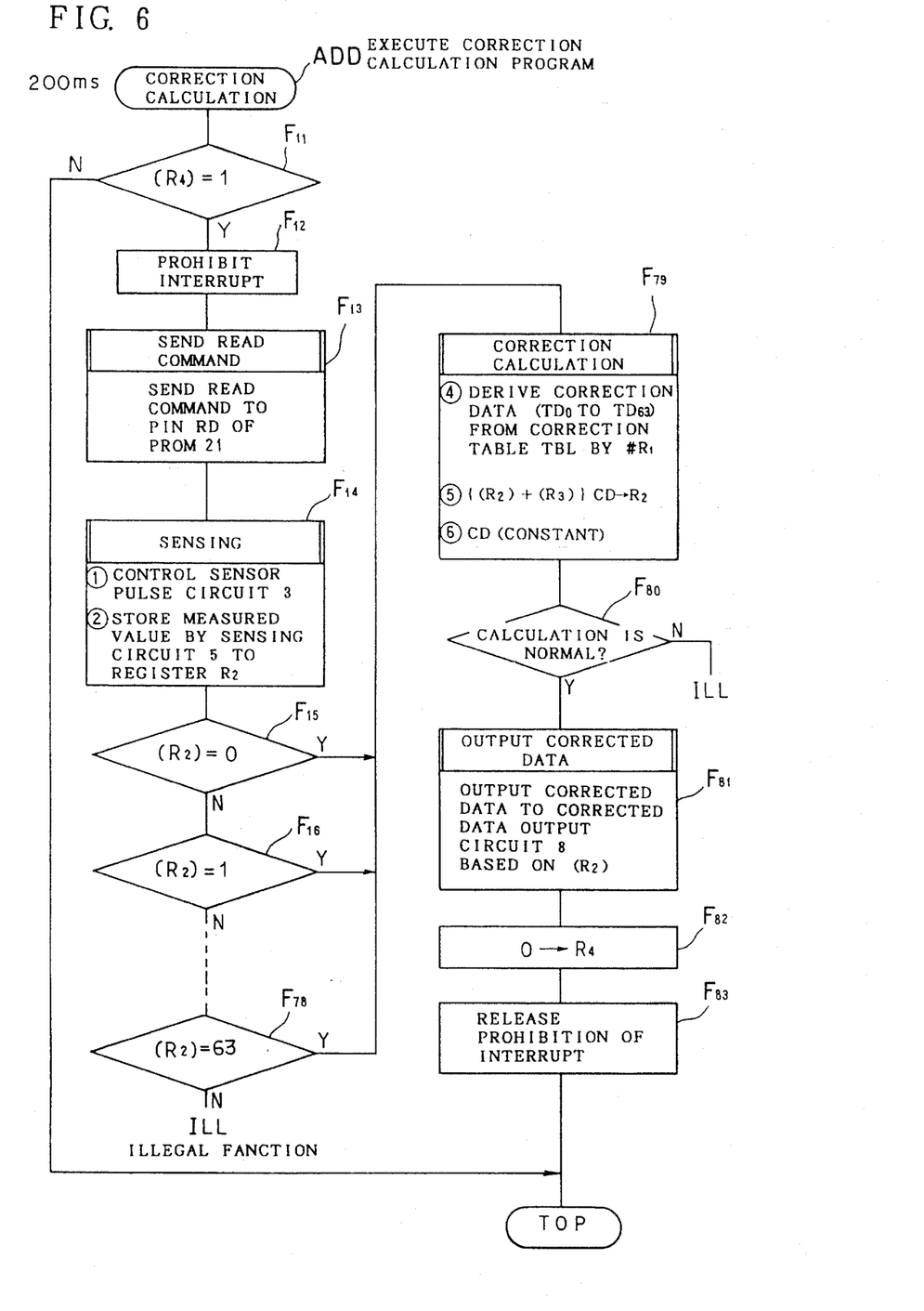
FIG. 6 is a flow chart for explaining a correction calculation program executed in the connector apparatus used in the measuring apparatus of the present invention.

The correction calculation program ADD corresponds to a periodic program initiated by the execution managing program in a period of 200 mS as shown in FIG. 6. This correction calculation program includes judging boxes $F_{11}$, $F_{15}$ to $F_{78}$, processing boxes $F_{12}$, $F_{82}$, $F_{83}$, and subroutines $F_{13}$, $F_{14}$, $F_{79}$, $F_{81}$. At the first judging box $F_{11}$, a judgement is made as to whether or not the content of the calculation register $R_4$ is equal to 1. If false (N) (not equal to 1), the control operation is transferred to the execution managing program. When it is so judged that the content of the calculation register $R_4$ is 1, the interrupt is prohibited at the processing box $F_{12}$, and this flow operation is advanced to the read command sending subroutine $F_{13}$. When this read command sending subroutine $F_{13}$ is executed the read command is sent out to the pin RD of the PROM 21. Next, when the sensing subroutine $F_{14}$ is executed, (1) the sensor pulse sending circuit 3 shown in FIG. 4 is controlled, and (2) the measured values by the sensing circuit 5 (abbreviated from the sensing data shaping circuit 5) are stored into the calculation register $R_2$.

Figure 7:
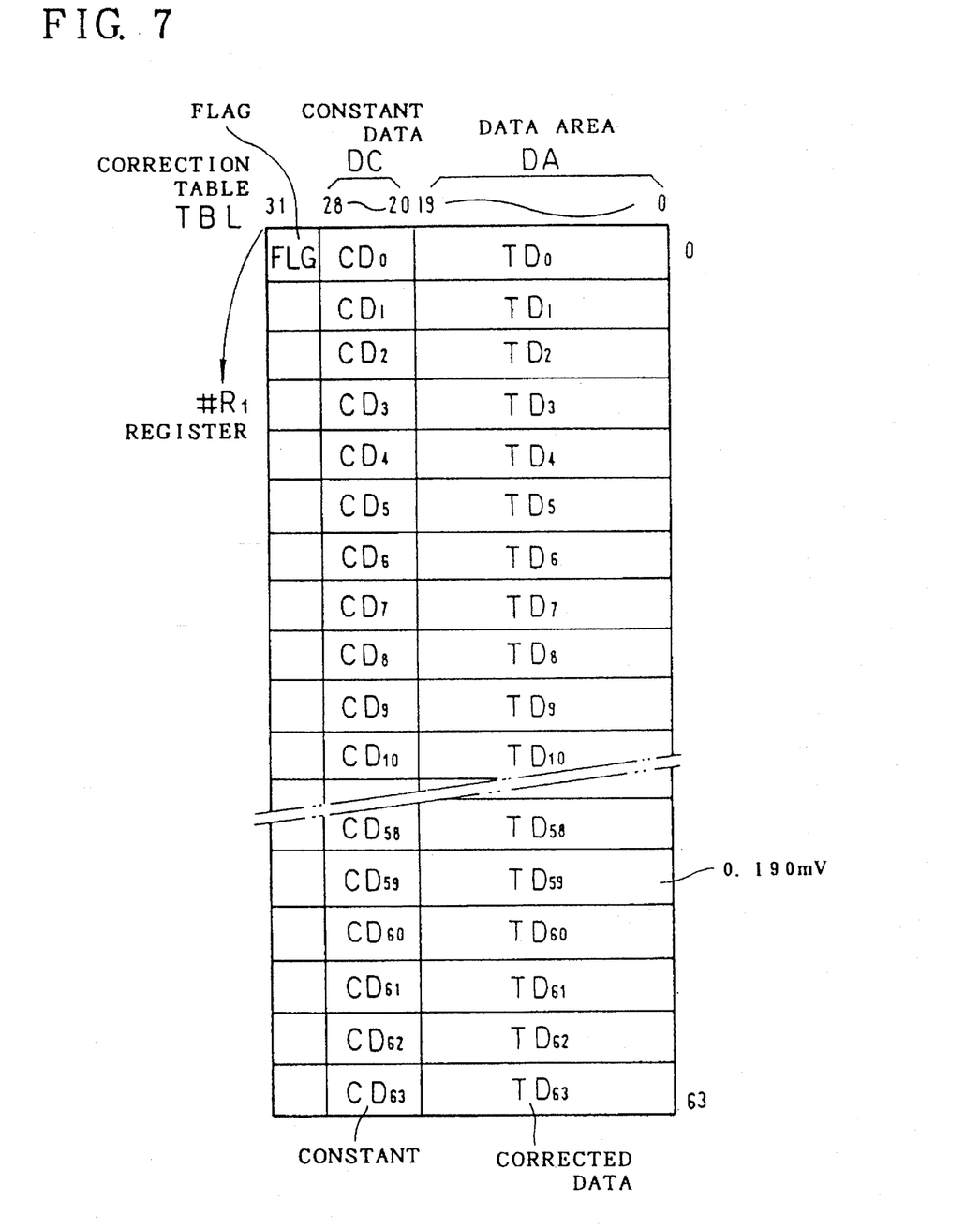
FIG. 7 schematically illustrates a data structure employed in the connector apparatus used in the measuring apparatus of the present invention.

While the sensing data subroutine $F_{14}$ is executed, if the numeral values of the calculation register $R_2$ are 0 to 63, then the flow operation is advanced to the correction calculation subroutine $F_{79}$. If the numeral values of this calculation register $R_2$ are any values greater then 63, then the flow operation is advanced via the judging box $F_{78}$ to an illegal function ILL, at which a warning sound is produced to announce that the measurement cannot be executed. In the correction calculation subroutine $F_{79}$, a correction table TBL as represented in FIG. 7 is accessed.

The correction table TBL is constructed of a rewritable memory as the EEPROM 18 shown in FIG. 4, and has a memory capacity of 0 to 63 words (one word corresponding to bits 1 to 31). The corrected data $TD_0$ to $TD_{63}$ stored in the respective data areas DA (bits 0 to 19) may be derived, or read out based upon the numeral values stored in the calculation register $R_1$. It should be noted that bits 28 to 31 are utilized as a flag FLG, and are activated, depending upon such a condition whether or not the correction data $TD_0$ to $TD_{31}$ are present. Constants $CD_0$ to $CD_{31}$ are stored in constant data DC (bits 20 to 27).

At (4) of the correction calculation subroutine $F_{79}$, the correction data ($TD_0$ to $TD_{63}$) is read out from the correction table TBL in correspondence to the numeral value of the calculation register $R_1$ and is stored into the calculation register $R_3$. At (5) of the correction calculation subroutine $F_{79}$, the numeral value (measured value) of the calculation register $R_2$ are added to the numeral value (correction data $TD_0$ to $TD_{63}$) of the calculation register $R_3$. The added value may be multiplied by tile corresponding constant $CD_0$ to $CD_{63}$ at (6) of subroutine $F_{79}$, and then the calculated value is stored in the calculation register $R_2$. Next, a judgement is made as to whether or not the calculated value is normal at the judging box $F_{80}$. If the calculated value is abnormal, then the process operation becomes the illegal function ILL, and a warning sound for announcing that the measurement cannot be performed is produced. To the contrary, if the calculated value is normal, then the corrected data output subroutine $F_{81}$ is executed in which the corrected data output circuit 8 is controlled in accordance with the numeral value of the calculation register $R_2$. Also, after the numeral value of the calculation register $R_4$ is set to 0 at the process $F_{82}$, and the prohibition of interrupt is released at the process $F_{83}$, the control operation is transferred to the execution managing program.

In the connector apparatus used to the measuring apparatus having such a structure, when the plugs $P_0$ to $P_9$ of the connector CON are plugged to the jacks $J_0$ to $J_9$ of the measuring apparatus EQ, the reference potential point connected to the jack $J_0$ is connected to the plug $P_0$ of the connector CON.

When the measuring button FK of the measuring apparatus EQ is depressed, the jack $J_7$ to which the cable driver 16d is connected is coupled with the plug $P_7$ of the connector CON.

When the read command program RDC shown in FIG. 5 is initiated, the process operation is advanced from the judged box $F_1$ to the processing box $F_2$ at which the contents of the calculation registers $R_1$ to $R_4$ are initialized. In the read command subroutine $F_3$, the numeral values of the PROM 21 ($D_0$ to $D_5$) are stored in the calculation register $R_1$. Next, after the content of the calculation register $R_4$ is set to 1 at the processing box $F_6$, the control operation is transferred to the execution managing program.

When a judgement is made that the content of the calculation register $R_4$ is 1 at the judging box $F_{11}$ of the initiated correction calculation program ADD, the interrupt operation is prohibited at the processing box $F_{12}$. Further, the read command subroutine $F_{13}$ and the sensing subroutine $F_{14}$ are executed, the sensor pulse sending circuit 3 shown in FIG. 4 is controlled at (1), and the measured values by the sensing circuit 5 (abbreviated from the sensing data shaping circuit 5) are stored into the calculation register $R_2$ at (2).

For instance, assuming now that the numeral values of the pins $D_0$ to $D_5$ of the PROM 21 are "111011", the numeral value stored into the calculation register $R_1$ becomes 59, which corresponds to the measurement item.

When the corrected data table TBL shown in FIG. 7 is retrieved under such a condition that the numeral value stored in the calculation register $R_1$ is used as the address, the correction data $TD_{59}$ stored at the address of 59 can be read out.

Assuming now that the measurement item is wavelength data, the corrected data $TD_{59}$ becomes 0.190 mV. As to the wavelength data of the light receiving element, which has been actually measured, assuming now that 660 nm is recognized as the reference value and absorbance of this reference value is 98% (0.200 mV), the wavelength data of 660 nm will be 659 nm, namely be shifted by 1 nm due to a change in absorbance caused by oxygen concentration in blood to be measured. As a result, the calculated value in this case becomes 97.5% of 659 nm (0.190 mV).

It should be noted that depending upon the measurement item, the numeral values (measured value) of the calculation register $R_2$ are added to the numeral values (corrected data $TD_0$ to $TD_{63}$) of the calculation register $R_3$ in (5), and then the added values are multiplied by the constants $CD_0$ to $CD_{63}$ defined in (6), and thereafter the calculated values are registered in to the calculation register $R_2$.

Furthermore, with respect to such optical data as respiration periods and pulse rates, which are not the wavelength elements, an operating sequence for previously removing fluctuation in the characteristics of the light emitting element 31 and the light receiving element 30 by the background noise removing circuit 4 under control of the CPU 20, is executed by the correction calculation program.

The sensing subroutine $F_{14}$ of the correction calculation program ADD is executed, and the sensing pulse is sent out from the sensor pulse sending circuit 3 via the jack $J_9$ to the sensor SEN.

When the sensing pulse is transmitted to the sensor SEN, the sensing data is inputted from the jack $J_8$ to the background noise removing circuit 4.

The sensing subroutine $F_{14}$ of the correction calculation program ADD is executed, the sensing data shaping circuit 5 is operated, the sensing data is converted into the digital sensing data by the A/D converting circuit 6, and finally the digital sensing data is supplied via the cable receiver 15 and the data bus 17 to the CPU 20.

The CPU 20 furnishes the inputted sensing data via the D/A converting circuit 7 and the correction data output circuit 8 to the display 9 so as to display thereon the content of this sensing data.

It should be understood that this control is performed by the correction calculation program ADD.

In accordance with the connector apparatus of the present invention used to the measuring apparatus, there are various advantages as follows:

Since the ROM from which the measurement items can be read out in accordance with the read command program is constructed of the PROM, various types of connectors suitable for the measurement items can be previously manufactured before being marketed.

As the jacks engaged with the connector are employed in the measuring apparatus, the connection between the connector and the jacks may be standardized.

Because the sensor pulse is sent out from the sensor pulse sending circuit employed in the measuring apparatus via the jack engaged with the connector, the sensor is periodically operated thereby to assure statical reliability of the sensing data.

As the background noise is removed by the background noise removing circuit employed in the measuring apparatus, the sensing data are not disturbed by the background noise. As a consequence, no longer calibration is required.

As the sensing data outputted from the background noise removing circuit is shaped by the sensing data shaping circuit provided in the measuring apparatus, an error contained in the sensing data to be processed by the CPU can be reduced.

Since the correction data TBL used in the read command program is provided with the measuring apparatus, a large number of measurement items can be selected.

Also, since this correction table TBL is employed in the EEPROM 18, the correction values may be easily modified.

The high measuring precision can be achieved since the data read by the read command program is corrected by the correction calculation program employed in the measuring apparatus.

Since the corrected data which have been corrected by the correction calculation program can be outputted from the corrected data output circuit employed in the measuring apparatus, the corrected data can be continuously outputted without any process.

It should be noted that the memory capacity of the PROM build in the connector CON in the above-described embodiment is not limited to 32 bits. Instead of this PROM, not only a ROM, but also an EPROM (erasable and programmable read only memory), and an EEPROM (electrically erasable and programmable read-only memory) may be employed.

As apparent from the foregoing descriptions, in accordance with the connector apparatus used to the measuring apparatus of the present invention, the method for connecting the sensor with the measuring apparatus can be standardized. Moreover, in the measuring apparatus, the mechanical key employed in either the connector, or the measuring apparatus may be realized as the software, the circuit logic may be programmed, and no calibration is required for the measurement items, and the high measuring precision can be realized with easily changing the correction values.

What is claimed is:

1. A connector apparatus comprising:
   a connector having a plurality of plugs to be connected to a plurality of corresponding jacks provided in a measuring apparatus, and a PROM having stored therein one of a plurality of measurement identification codes to be outputted through first plugs of the plurality of plugs to corresponding first jacks of the plurality of jacks;

a sensor connected to second plugs of the plurality of plugs of the connector and having an LED and a light receiving element for sensing a light quantity as measured data received by the light receiving element from the LED;

a ROM having a stored read command program to read out said one measurement identification code from the first jacks and having a stored correction calculation program to correct the measured data sensed by the sensor;

a sensor pulse transmitting circuit controlled by the correction calculation program for transmitting a sensor pulse via second jacks of the plurality of jacks corresponding to the second plugs to the sensor to produce said measured data on said second plugs and said second jacks;

a background noise eliminating circuit for eliminating background noise from the measured data input via the second plugs and the second jacks from the sensor to output sensing data;

a sensing data shaping circuit for shaping the sensing data output from the background noise elimination circuit, an EEPROM containing a correction table having a stored plurality of correction data corresponding to the plurality of measurement identification codes so that one of said plurality of correction data corresponding to the one measurement identification code is used by the correction calculation program to correct the measured data in the shaped sensing data;

a corrected data outputting circuit for outputting the corrected measured data as corrected in accordance with the correction calculation program; and a display for displaying the corrected measured data supplied from the corrected data outputting circuit.

2. A connector apparatus as claimed in claim 1 wherein the plurality of correction data each includes an addition factor and a multiplication factor for correcting the measured data.

* * * * *

UNITED STATES PATENT AND TRADEMARK OFFICE
CERTIFICATE OF CORRECTION

PATENT NO. : 5,528,519
DATED : June 18, 1996
INVENTOR(S) : OHKURA et al

It is certified that error appears in the above-indentified patent and that said Letters Patent is hereby corrected as shown below:

Col. 5, line 26, "JT" should read --$J_7$--.

Col. 6, line 37, "tile" should read --the--.

Signed and Sealed this

Twenty-second Day of October, 1996

Attest:

BRUCE LEHMAN

Attesting Officer    Commissioner of Patents and Trademarks